No. 793,577. PATENTED JUNE 27, 1905.
P. W. FRANK.
REVERSE VALVE.
APPLICATION FILED JUNE 14, 1904.
2 SHEETS—SHEET 1.
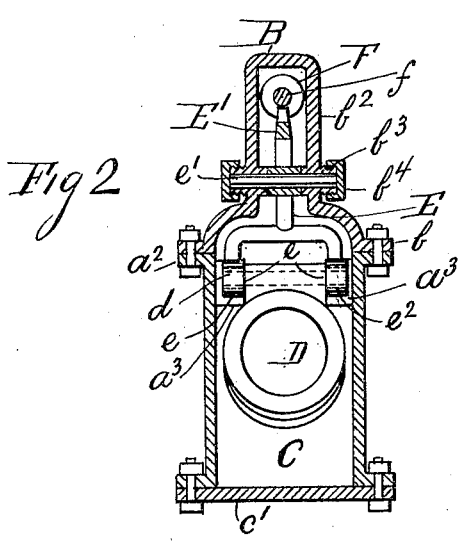
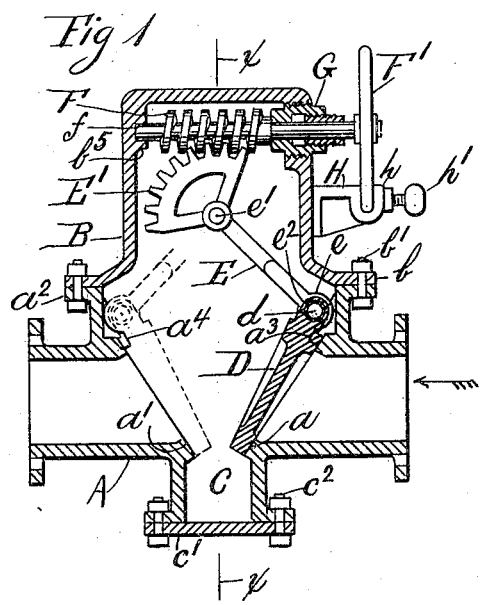
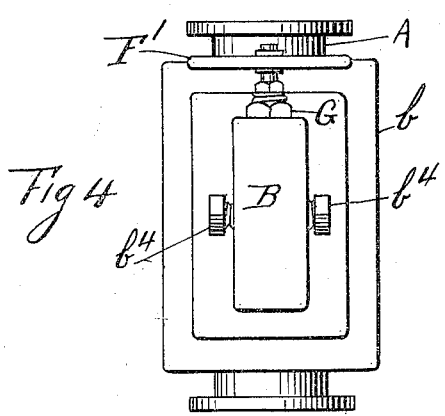
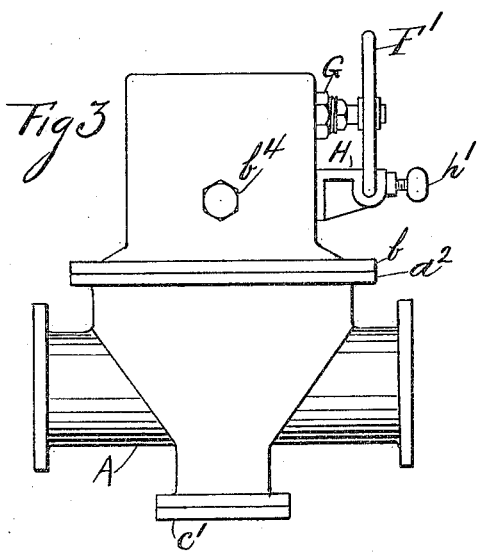
Witnesses
Henry C. Karlson
Newton Harrison
Inventor
Philip W. Frank
By his Attorney
A. A. de Bonneville.

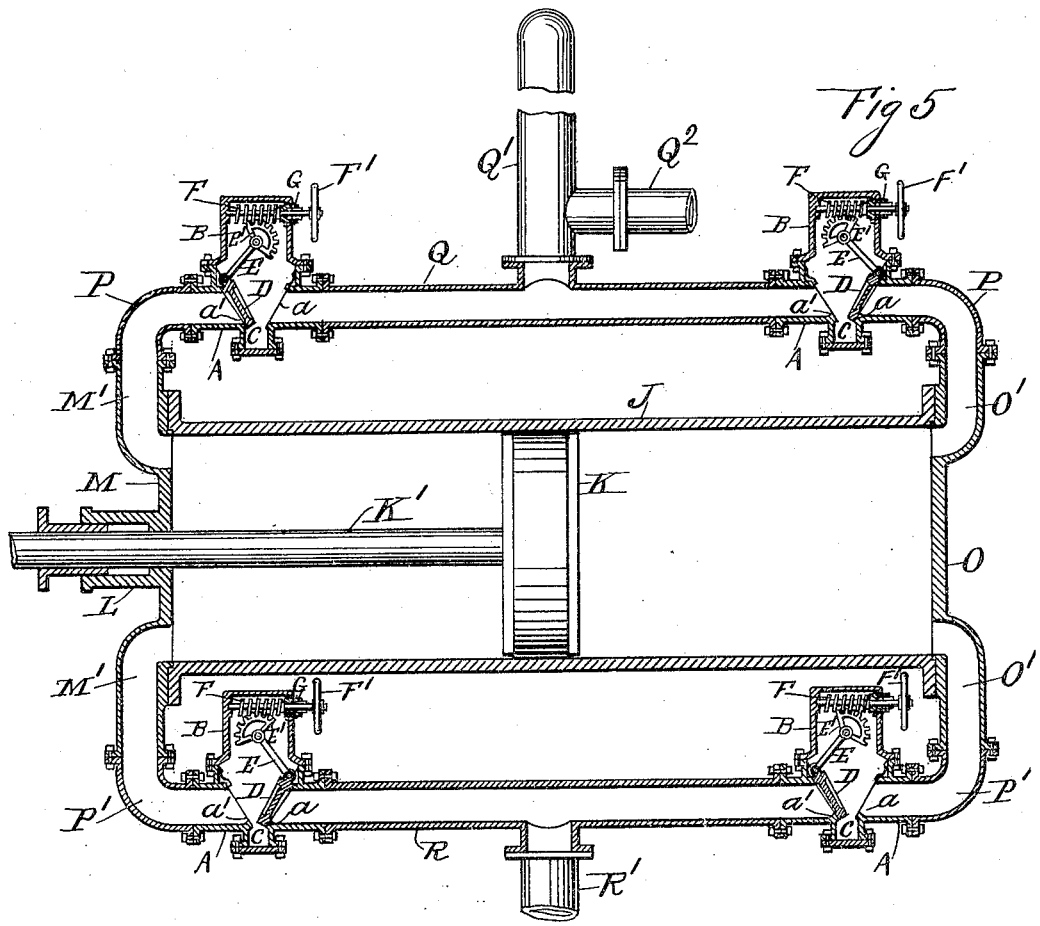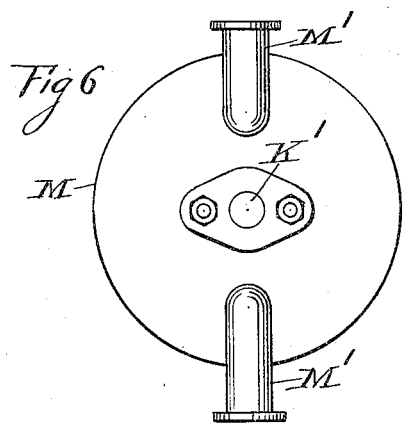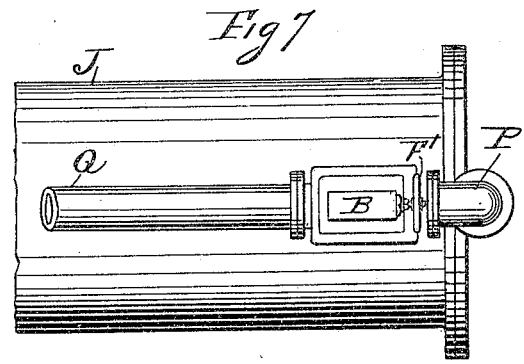

No. 793,577.

Patented June 27, 1905.

UNITED STATES PATENT OFFICE.

PHILIP W. FRANK, OF BAYONNE, NEW JERSEY.

REVERSE-VALVE.

SPECIFICATION forming part of Letters Patent No. 793,577, dated June 27, 1905.

Application filed June 14, 1904. Serial No. 212,469.

*To all whom it may concern:*

Be it known that I, PHILIP W. FRANK, a citizen of the United States, and a resident of Bayonne, in the county of Hudson and State of New Jersey, have invented certain new and useful Improvements in Reverse-Valves, of which the following is a specification.

This invention relates to a reverse-valve, and has for its object the production of a valve with a valve-chest having two seats and means to operate the valve with either one of the seats, whereby the action of the valve can be reversed.

In the drawings I have shown the valve in connection with a pump, by which combination the piping of the pump can be employed alternately for the suction or discharge.

Figure 1 shows a partial vertical axial section of the valve and its appurtenances. Fig. 2 represents a section of Fig. 1 on the line $xx$. Fig. 3 is a side front view of the invention. Fig. 4 represents a top view of Fig. 2. Fig. 5 shows a vertical longitudinal section of a pump with valves embodying the invention. Fig. 6 is a partial front view of Fig. 5, and Fig. 7 shows a partial top view of Fig. 5.

The invention is shown with a valve-chest comprising the body A, having the inclined valve-seats $a$ $a'$, secondary seats $a^3$ $a^4$, flanges $a^2$, and the bonnet B, with the flanges $b$, the said body and bonnet being coupled together with the bolts $b'$. A chamber C is located at the lower central portion of the body A, which has bolted to it the bonnet $c'$ with the bolts $c^2$. A valve D, having the hinge-pin $d$, is arranged to swing in the bosses $e$ of the lever E, the openings $e^2$ in the bosses being somewhat larger than the pin $d$. The lever is fulcrumed on the pin $e'$, which is supported in the walls $b^2$ of the bonnet and threaded bosses $b^3$, which latter are covered by the screw-caps $b^4$. The lever has at its upper end the worm-sector E, that meshes with a worm F, the shaft $f$ of which is supported at one end in the bearing $b^5$ and at the other end in the stuffing-box G, and carries the hand-wheel F'. Extending from the side of the said bonnet B is the bracket H, having the U-shaped end $h$, carrying the screw $h'$, by means of which the wheel F' can be clamped in operative position, thereby securely maintaining the bosses $e$ in either the seats $a^3$ or $a^4$, so as to locate the valve D in proper position.

Referring to Figs. 5 to 7, a pump-barrel is shown at J with a piston K and piston-rod K', the latter operating through the stuffing-box L, carried in the front cylinder-head M, having the ports M'. A rear cylinder-head is shown at O with the ports O'. Elbows P connect the cylinder-heads with bodies A of the valves on the discharge side of the pump, and elbows P' connect the cylinder-heads with the bodies A of the valves on the suction side of the pump. Piping Q, with the air-chamber Q' and discharge-piping Q², connects the valve-bodies A on the discharge side, and piping R, with the suction-pipe R', connects the valve-bodies A on the suction side of the pump. To operate the valve, and first referring to Fig. 1, a fluid may be handled in the direction of the arrow, the valve D, swinging on the hinge-pin $d$, rising to permit the fluid to pass. When it is desired to handle a fluid through the valve in a direction opposite to said arrow, the valve D is caused to operate on the valve-seat $a'$ by first unscrewing the screw $h'$ and then turning the hand-wheel F', which latter engaging the worm-sector E' will throw the valve D to the position shown in dotted lines, after which the screw $h'$ is screwed up to hold the said hand-wheel securely in place. The bosses $e$ are securely held in the seats $a^3$ or $a^4$, and the openings $e^2$ being somewhat larger in diameter than the hinge-pin $d$ allow the valve D to make contact with its valve-seat $a$ or $a'$ and to operate properly thereon.

In Fig. 5 the valves D are located so that the fluid will enter the pump-barrel by way of the suction-pipe R' and piping R and be discharged through the piping Q Q², and if the valves are operated on the seats opposite to that shown in Fig. 5 the fluids can then enter the pump through the piping Q Q² and be discharged through the piping R and R'.

Having described my invention, I claim—

1. The combination of a valve-body, two valve-seats therein, a secondary seat adjacent to each one of the valve-seats, one valve for the valve-seats, a lever arranged to move the valve, a boss at one end of the lever the said valve hinged to the boss, means to move the lever so that said boss is seated in either one of the secondary seats, and the valve brought adjacent to the valve-seat adjacent to the secondary seat, that seats the said boss.

2. The combination of a valve-body, two valve-seats therein, a lever fulcrumed over the valve, a hinge-pin in the end of the lever, a valve swinging on the pin, a hand-wheel, means between the hand-wheel and the said lever to move the latter by the hand-wheel, a bracket adjacent to the hand-wheel, and a screw to tighten the hand-wheel to said bracket.

3. The combination of a valve-body, two valve-seats formed therein, a lever fulcrumed over the seats, a valve hinged to one end of the lever, a worm-sector at the other end of the lever, a worm meshing with the worm-sector, means to turn the worm, and thereby move the lever to move the valve from one valve-seat to the other.

4. The combination of a valve-body, two valve-seats therein, a pair of secondary seats adjacent to each one of the valve-seats, a lever fulcrumed over the valve-seats, bosses at one end of the lever, a valve hinged in the bosses, means to throw the lever so that the bosses thereof are seated in either pair of the secondary seats, and the valve brought to the valve-seat adjacent to the secondary seat, that seats the bosses.

5. The combination of a valve-body, two valve-seats therein, a pair of secondary seats, adjacent to each one of the valve-seats, a lever fulcrumed over the valve-seats, bosses at one end of the lever, a hinge-pin supported in holes in the bosses, the said holes being larger than the said pin, a valve swinging on the pin, a worm-sector on the lever, a worm meshing with said sector, a hand-wheel on the shaft of the worm, means to clamp the hand-wheel in operative position.

6. The combination of a valve-body, two inclined valve-seats therein, a chamber below the said valve-body, a bonnet above the said body, a valve, means in the bonnet to move the valve in proper position for either one of the valve-seats, a hand-wheel on the outside of the bonnet and connected with the said means therein, a bracket extending from the bonnet, and means to clamp the wheel with said bracket in different positions.

7. The combination in a pump, of a barrel, two lines of piping, each line of piping connecting the ends of the barrel, and each line having an opening formed therein, two valve-bodies in each line of piping, a pair of valve-seats in each valve-body, secondary seats adjacent to each valve-seat, a lever arranged with each valve-body, bosses at the end of each lever, a valve hinged in said bosses, means to move each lever so that its bosses are seated in either pair of secondary seats formed in the valve-body in which they are contained, and the valve brought in proper position for the valve-seat, that is adjacent to the secondary seats that seat the bosses of the lever in the valve-body.

Signed at Bayonne, in the county of Hudson and State of New Jersey, this 9th day of May, A. D. 1904.

PHILIP W. FRANK.

Witnesses:
EDWARD P. FRANK,
WILLIAM J. NORRIS.